UNITED STATES PATENT OFFICE 2,438,200

N,N'-BIS(3-DIETHYLAMINOPROPYLAMIDE) OF DIBASIC ALIPHATIC ACIDS

Lyell C. Behr and Richard S. Schreiber, Wilmington, Del., assignors to E. I. du Pont de Nemours & Company, Wilmington, Del., a corporation of Delaware No Drawing. Application March 4, 1946, Serial No. 651,981

1 Claim. (Cl. 260—561)

This invention relates to new amides, the N,N'-bis-(tertiary-aminoalkyl) amides of dicarboxylic acids, and to their preparation.

It is an object of this invention to make available a new class of amides, the N,N'-bis-(tertiary-aminoalkyl)-amides of dicarboxylic acids. Another object is to provide new amides of dicarboxylic acids containing, in addition to the amide functions, basic nitrogen groups which are tertiary-aminoalkyl groups. A still further object is to provide a process for preparing these new diamides. Other objects will appear hereinafter.

These objects are accomplished by the invention of N,N'-bis-(tertiary-aminoalkyl) amides of dicarboxylic acids and a process for their preparation which comprises reacting an amide-forming derivative of a dicarboxylic acid with an N,N-dialkylaminoalkylamine, and isolating the diamide so obtained. Amide-forming derivatives are meant to include the dicarboxylic acids, their esters, their acid halides and their anhydrides.

The new products of this invention have the general formula

wherein A is a bivalent hydrocarbon radical, preferably polymethylene, B is a diacyl radical of a dicarboxylic acid, preferably of a hydrocarbon dicarboxylic acid, and R is a monovalent hydrocarbon radical, preferably alkyl of one to five carbon atoms.

The reaction leading to these products is illustrated by the following equation which represents the formation of the N,N'-bis-(2-diethylaminoethyl) sebacamide from diethyl sebacate and N,N-diethylaminoethylamine:

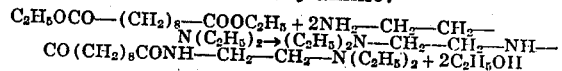

The invention is illustrated by the following examples which describe the preparation of a number of representative members of the class of N,N'-bis(tertiary-aminoalkyl) amides of dicarboxylic acids. Parts are by weight unless otherwise indicated.

Example I

A mixture of 51.7 parts of diethyl sebacate and 50 parts of N,N-diethylaminoethylamine was heated slowly in a glass reaction vessel equipped with a fractionating column and with a downward condenser. The internal temperature of the reactants was gradually increased to about 150° C., where it was maintained for about 1.5 hours before the head temperature of the column reach 78° C. and ethyl alcohol started to distill. By slowly increasing the reaction temperature to 210° C. during a period of about 8 hours, a total of 14.6 parts of ethyl alcohol was removed by distillation. The cooled, light yellow, residual solid reaction mixture was then recrystallized from a mixture of 9 parts of petroleum ether (B. P. 30–75° C.) and 1 part of benzene, whereby 55 parts of white crystals of N,N'-bis(2-diethylaminoethyl) sebacamide, M. P. 78–79° C., were obtained. This product was insoluble in water and petroleum ether, appreciably soluble in ethanol, and very soluble in benzene.

Analysis: Calculated for $C_{22}H_{46}N_4O_2$: C, 66.26; H, 11.65; N, 14.06. Found: C, 66.26, 66.39; H, 11.87, 11.58; N, 14.01, 14.19.

Example II

Using the same reaction apparatus as described in Example I, a mixture of 50.5 parts of diethyl adipate and 58 parts of N,N-diethylaminoethylamine was heated first at an internal temperature of 140–150° C. until the distillation of ethanol practically ceased, and then at an internal temperature of 175–180° C. until a total of 21–26 parts of ethanol had distilled over. The light yellow residual solid on recrystallization from a mixture of 9 parts of petroleum ether (B. P. 30–75° C.) and 1 part of benzene gave 42 parts of fine white needles of N,N'-bis-(2-diethylaminoethyl) adipamide, M. P. 75–76° C. This amide was soluble in water, ether, ethanol, dioxane and benzene, but only slightly soluble in petroleum ether.

Analysis: Calculated for $C_{18}H_{38}N_4O_2$: C, 63.16; H, 11.11; N, 16.37. Found: C, 62.51, 62.67; H, 11.11, 10.08; N, 16.43, 16.29.

Example III

N,N' - bis - (3 - diethylaminopropyl) adipamide was prepared by the same general procedure and with the same equipment described in the above examples. N,N-diethylaminopropylamine (53 parts) and diethyl adipate (40 parts), intimately mixed, were reacted together at a temperature of 140° C. where the alcohol (ethanol) first distilled over. After maintaining the reaction at 140° C. for one hour, the temperature was gradually increased to 220° C. during a period of 5 hours and a total of 15.8 parts of evolved ethanol was collected. The cooled residue was added to 200 parts of water and sufficient concentrated hydrochloric acid added to give a pH of 2 (Alkacid test paper). The resulting solution was washed with two portions of ether (71 parts each), after which it was treated with 20% aqueous sodium hydroxide to regenerate the basic amide which was then extracted with two portions (71 parts each) of ether. On evaporation of the ether 35 parts of light yellow N,N'-bis-(3-diethylaminopropyl)adipamide was obtained as an oil.

Analysis: Calculated for $C_{20}H_{42}N_4O_2$: N, 15.12. Found: N, 14.50, 14.53.

*Example IV*

Forty (40) parts of N,N-diethylaminoethylamine was placed in a glass reaction vessel equipped with a mechanical stirrer, reflux condenser, ice-cooling bath, thermometer and dropping funnel. To the vigorously stirred, ice-cooled amine, a mixture of 25 parts of diethyl oxalate in 19.7 parts of ethanol was added slowly with the temperature between 0° and +5° C. during 15 minutes. The ice bath was then removed and the reaction was continued at ordinary room temperature for two hours with stirring, after which the alcohol was removed by distillation over a steam bath. On cooling, 45 parts of light yellow solid N,N'-bis-(2-diethylaminoethyl)oxamide, melting at 38–40° C., was obtained. This product was very soluble in methanol and ethanol, and somewhat less soluble in petroleum ether and water.

Analysis: Calculated for $C_{14}H_{30}N_4O_2$: C, 58.74; H, 10.48. Found: C, 58.37, 58.52; H, 10.84, 10.53.

*Example V*

A glass reactor was charged with 37.5 parts of dimethyl terephthalate and 56.5 parts of N,N-diethylaminoethylamine, sealed, and then heated in an oil bath at 135° C. for 8 hours. The reactor was cooled, opened, and the contents removed.

Purification of this reaction product was accomplished by first washing with 100 parts of water and then dissolving in 100 parts of 10 per cent hydrochloric acid. This aminehydrochloride salt solution was filtered from insoluble material, the amide reprecipitated from the filtrate with 20% aqueous sodium hydroxide solution, filtered, washed with water, and dried. Recrystallization of this product (M. P. 104–120° C.) from a mixture of 7 parts methanol and 3 parts of water gave 32 parts of white crystals of N,N'-bis(2-diethylaminoethyl)-terephthalamide, M. P. 136–137° C. This amide was insoluble in water and ether, but soluble in benzene and ethanol.

Analysis: Calculated for $C_{20}H_{34}N_4O_2$: C, 66.30; H, 9.40; N, 15.47. Found: C, 66.65, 65.91; H, 9.55, 9.12; N, 15.46, 15.51.

The invention has been described with particular reference to N,N'-bis-(dialkylaminoalkyl) amides of aliphatic dicarboxylic acids of two, six and ten carbon atoms and terephthalic acid since these are typically representative of the class of N,N'-bis-(tertiary-aminoalkyl) amides of dicarboxylic acids. Other dicarboxylic acids, or their amide-forming esters, acyl halides and anhydrides, however, may be employed in the preparation of the amides of this invention among which may be mentioned oxalic acid in which the diacyl groups are joined together, and those in which the two acyl groups are separated by a bivalent hydrocarbon radical. This bivalent hydrocarbon radical may be aliphatic preferably of 1 to 11 carbon atoms, inclusive, and may be either straight or branched chain but preferably straight chain; the bivalent hydrocarbon radical may also be alicyclic, preferably cyclohexylene, or aromatic, preferably phenylene. Examples of such acids other than those already described include malonic, succinic, glutaric, pimelic, suberic, azelaic, sebacic, brassylic, methyladipic, isopropylsuccinic, dimethylglutaric, methylpimelic, hydromuconic, glutaconic, hexahydrophthalic, hexahydroterephthalic, phthalic, and isophthalic acids, etc. Acids of the oxalic acid series are desirable because of their ready availability.

Other amide-forming derivatives of the foregoing acids may be used including the monoesters, e. g., mono-ethyl ester of methyladipic acid; the mono-acyl halides, e. g., the mono acid chloride of pimelic acid; the diacyl halides, e. g., sebacyl chloride; the mixed ester-acyl halides, e. g., beta-carbobutoxy-propionyl chloride; diverse esters, e. g., the dipropyl and diamyl esters of hexahydro-o-phthalic acid and the dibutyl and diamyl esters of o-phthalic acid; and mixed diesters, e. g., ethyl butyl malonate, etc., although the lower dialkyl esters, particularly those in which the alkyl group is from one to five carbon atoms, are preferred.

Various primary tertiary diamines wherein the bivalent radicals on the tertiary nitrogen are aliphatic (including cycloaliphatic) hydrocarbon radicals may be employed in the preparation of the compounds of this invention. These amines are of the general formula $R_2N-A-NH_2$ wherein the amino groups are separated by a bivalent hydrocarbon radical (A) and attached thereto thru aliphatic carbon; R is a monovalent hydrocarbon radical. The bivalent hydrocarbon radical (A) may be aliphatic, preferably of 2 to 10 carbon atoms, inclusive, and may be either straight or branched chain, preferably straight chain; the bivalent hydrocarbon radical may also be alicyclic, preferably cyclohexylene; the monovalent hydrocarbon radical, (R) may be open chain and preferably alkyl of one to five carbon atoms. In some instances the two R's can represent a chain of carbon atoms, such as pentamethylene, in which the terminal carbon atoms are directly bonded to the nitrogen atom to form a heterocyclic ring. Specific examples of said amines applicable to this invention are N,N-diamines, N',N' - diethyl-1,4-ethylhexamethylenediamine, $N^4$, $N^4$-diethyl-1,4-pentanediapentanediamine, N,N-diethyl - 1, 4 - cyclohexanediamine, N,N-dibutyl-1,3 - cyclohexanediamine, beta-(1-piperidyl)ethylamine, etc.

Although in the foregoing examples certain specific conditions of temperature, pressure, reaction periods, reactants and reactant concentrations and proportions have been recited, it is to be understood that these values are subject to considerable variation within the scope of this invention.

The amidation between the various reactants recited herein may be carried out at any temperature, up to the decomposition point of the reactants, which permits a suitable rate of reaction. The temperature may vary in individual cases as may be seen from the examples. In case of the N,N'-bis-(2-diethylaminoethyl)oxamide the reaction appears quite vigorous even at 0° C., whereas with the higher aliphatic dicarboxylic acids, the preferred temperature is above 100° C. In general, with preferred reactants, the temperature is above 100° C., preferably between 140 and 250° C. It is convenient whenever possible to remove the by-product as it forms; in the case of the preferred dialkyl esters, the alkanols may be removed. Generally, no solvent is necessary, but solvents preferably high boiling, such as dibutyl ether, xylene, etc., may be used particularly if the reaction tends to be vigorous. It is advantageous, especially when dialkyl esters are employed, to use approximately equivalent amounts of the reactants, i. e., approximately two moles of amine to one mole of the dialkyl ester, although an excess of the amine reactant does no harm. The di(tertiaryaminoalkyl)amide is conveniently isolated by crystallization if the compound is solid, or in certain cases, by fractional distillation.

The N,N'-bis-(tertiary-aminoalkyl)amides of dicarboxylic acids are useful as insecticides, as pharmaceutical agents and as intermediates for pharmaceuticals and detergents.

The foregoing detailed description has been given for clearness of understanding only and no unnecessary limitations are to be understood therefrom since the invention is not limited to the exact details disclosed. Obvious modifications will occur to those skilled in the art.

What is claimed is:

The N,N'-bis-(3-diethylaminopropylamide) of a dicarboxylic acid, R(COOH)$_2$ wherein R is a polymethylene, —(CH$_2$)$_n$—, radical and $n$ is an integer from four to eight.

LYELL C. BEHR.
RICHARD S. SCHREIBER.

REFERENCES CITED

The following references are of record in the file of this patent:

UNITED STATES PATENTS

| Number | Name | Date |
|---|---|---|
| 1,952,008 | Bruson | Mar. 20, 1934 |
| 2,009,144 | Miescher et al. | July 23, 1935 |
| 2,149,273 | Carothers | Mar. 7, 1939 |
| 2,263,013 | Scott | Nov. 18, 1941 |
| 2,272,466 | Hummel et al. | Feb. 10, 1942 |
| 2,310,873 | Sauer | Feb. 9, 1943 |
| 2,371,104 | Kienle | Mar. 6, 1945 |

OTHER REFERENCES

Blaise et al., "Bull. Soc. Chim." (Paris), series 4, vol. 3 (1908), pages 548–549.

Einhorn, "Liebigs Annalen," vol. 343 (1906), pages 274 and 275.